United States Patent
Yang et al.

(10) Patent No.: US 7,142,784 B2
(45) Date of Patent: Nov. 28, 2006

(54) MICROPROCESSOR-BASED OPTICAL SIGNAL CONDITIONER

(75) Inventors: Wei Yang, Fremont, CA (US); Li Chen, Fremont, CA (US); Dejin Yu, Fremont, CA (US); Diana Liu, Vancouver (CA); William Yu, Vancouver (CA)

(73) Assignee: BaySpec, Inc., Fremont, CA (US)

( * ) Notice: Subject to any disclaimer, the term of this patent is extended or adjusted under 35 U.S.C. 154(b) by 608 days.

(21) Appl. No.: 10/346,718

(22) Filed: Jan. 15, 2003

(65) Prior Publication Data

US 2004/0136709 A1 Jul. 15, 2004

(51) Int. Cl.
*H04B 17/00* (2006.01)

(52) U.S. Cl. .......................................... 398/34; 398/25

(58) Field of Classification Search ........ 398/157–161, 398/93–95, 38, 25, 79; 359/337.1, 515, 636
See application file for complete search history.

(56) References Cited

U.S. PATENT DOCUMENTS

| 5,386,128 A * | 1/1995 | Fossum et al. .......... 257/183.1 |
| 6,343,170 B1 * | 1/2002 | Sela ............................ 385/37 |
| 2002/0196492 A1 * | 12/2002 | Trisnadi et al. ............. 359/124 |

* cited by examiner

*Primary Examiner*—Kenneth Vanderpuye
*Assistant Examiner*—David Lee
(74) *Attorney, Agent, or Firm*—Carr&Ferrell LLP

(57) ABSTRACT

An optical device for conditioning a multi-channel optical signal is provided, comprising a channel separation and assembly unit and a signal processor. The signal processor comprises an optical attenuator for adjusting the power level of the signals, an optical detector for detecting the power level associated with each of the multiple channels, a reflective medium disposed between the optical attenuator and detector, and a microprocessor-based controller in electrical communication with the attenuator and detector for dynamically controlling the power distribution of the output signal.

33 Claims, 10 Drawing Sheets

MICROPROCESSOR-BASED OPTICAL SIGNAL CONDITIONER

FIELD OF THE INVENTION

The present invention relates generally to optical devices, and more particularly to systems and methods for conditioning optical performance of signals in all-optical fiber-optic communications networks.

BACKGROUND OF INVENTION

Dense wavelength-division multiplexing (DWDM) technology revolutionizes the modern optical communication industry. This is partially in response to the explosive growth of data transmission volume worldwide, for example in the area of the Internet. DWDM communication systems have been developed with the aim of providing high-speed and large-capacity transmission of multi-carrier signals over a single optical fiber. In accordance with DWDM technology, a plurality of concurrent signals, each of which having a different wavelength or frequency, are assembled (multiplexed) at the transmitter end with a wavelength-division multiplexer (Mux) to form a composite signal, which is then transmitted on a single fiber. Each wavelength occupies a signal channel and two adjacent signal channels are separated by a channel spacing, such as 100 GHz at ITU grid. The assembled multi-channel signal is transmitted into a fiber-optic communication network that consists of a set of nodes connected by a link. At the receiver end, the composite multi-channel signal is separated (demultiplexed) with a wavelength-division demultiplexer (DeMux) into their respective wavelength components. Each wavelength signal is then further processed or directed to other networks.

When an optical signal travels down a single-mode fiber, its intensity decays with the distance because the optical fiber has a finite attenuation. For example, the transmission distance is limited by attenuation to about 80 kilometers in a single-mode fiber. In order to keep the signal "useful" to transmit information, the optical signal has to be boosted by amplifiers. Optical amplifiers have been developed and used in strengthening signals without having to convert an optical signal between an electrical and optical form. In fact, it is the advent of C-band erbium-doped fiber amplifiers (EDFAs) that makes DWDM communication networks prevalent. Nowadays, EDFAs can cover both C- and L-band. Semiconductor and Raman optical amplifiers, which greatly extend transmission span, are commercially available.

Optical amplifiers have two key advantages. First, optical amplifiers are transparent and support any bit rates and data formats. Second, optical amplifiers strengthen optical signals in the entire operating wavelength range. For example, an erbium-doped fiber amplifier amplifies all wavelengths in C-band from 1528 nm to 1565 nm.

However, incidents affecting the signal quality such as uneven channel power distribution, wavelength drifts, and optical signal-to-noise ratio (OSNR) may occur in a fiber-optic network where optical amplifiers are used to boost the optical signal traveling along the fiber. Factors contributing to uneven power distribution across individual channels include non-uniform amplification gain of an optical amplifier and the use of optical add/drop multiplexers (OADM), nonlinear process such as stimulated Raman scattering, and so on. This requires optical devices to equalize channel powers or correct power tilt. Dynamic gain equalizers have been utilized to flatten amplified power profiles whereas channel equalizers have been developed to keep individual powers even. The channel wavelengths may drift from their standard values (e.g., ITU grid) due to laser aging, thermal effects, and misalignment of Mux/DeMux devices. Accordingly, wavelength information is important to manage networks. Further, in the use of optical amplifiers in cascade, mode competition, nonlinear processes such as four-wave mixing and stimulated light scattering, will unavoidably increase noise and degrade the signal. It would be desirable to have a spectrometer component that can provide a window at optical layer for monitoring the performance of the network.

Chromatic dispersion causing pulse spreading in time is another factor that limits the transmission distance of an optical signal in DWDM networks. For example, dispersion normal fiber with a dispersion minimum near 1300 nm has its dispersion coefficient of about 17 ps/nm.km at 1550 nm. With chirp free sources, such a chromatic dispersion limits the transmission distance to about 900 kilometers at 2.5 Gbit/s and about 200 kilometers at 5 Gbit/s. This is particularly the case when the data transmission rate becomes higher and higher reaching to about e.g., 10 Gbit/s or 40 Gbit/s. To cope with this issue, dispersion compensators have been developed and utilized to reshape the pulses.

Accordingly, it would be desirable to provide an intelligent, integrated, low-cost, and multi-functional optical signal conditioner at a module level, which provides optical amplification, optical reshaping and retiming.

SUMMARY OF THE INVENTION

The present invention provides a compact and cost effective optical device and a method that dynamically monitors the performance of DWDM signals, purposely conditions the signals, and rapidly provisions individual channels on all-optical networks.

The optical device for conditioning a multi-channel optical signal of the present invention comprises a channel separation and assembly unit and a signal processor. The signal processor comprises an optical attenuator for adjusting the power level of the signals, an optical detector for detecting the power level associated with each of the multiple channels, a reflective medium disposed between the optical attenuator and detector, and a microprocessor-based controller in electrical communication with the attenuator and detector for dynamically controlling the power distribution of the output signal. The optical attenuator has multiple attenuating elements each corresponding to one of the multiple channel signals. The optical detector has multiple detecting elements each corresponding to one of the multiple attenuating elements. The reflective medium reflects a first portion of each of the multiple channel signals transmitted through the attenuating elements and allows a second portion of each of the multiple channel signals to transmit into the corresponding one of the multiple detecting elements. The detecting elements detects the power level of the second portion of each of the multiple channel signals transmitted though the reflective medium and converts optical signals to electrical data. The microprocessor-based controller receives and processes the electrical data, and controls the multiple attenuating elements according to the processed electrical data in adjusting the power level of the reflected first portion of each of the multiple channel signals to provide conditioned channel signals.

The method of conditioning a multiplexed multi-channel optical signal of the invention comprises the following steps:

separating the multiplexed signal into multiple channels having a power level associated with each of the channels;

passing each of the separated channel signals through a variable optical attenuator. The optical attenuator having multiple attenuating elements for adjusting power levels of the channel signals passed though the optical attenuator;

passing each of the attenuated channel signals through a partially reflective medium. The reflective medium reflects a first portion of each of the attenuated multiple channel signals to the attenuating elements and transmits a second portion of each of the attenuated multiple channel signals to an optical detector. The optical detector has multiple detecting elements corresponding to each of the multiple attenuating elements.

detecting the power level of the second portion of each of the multiple channel signals passed through the reflective medium; and controlling the attenuating elements in adjusting the power level of the first portion of the signal of each of the multiple channels reflected by the reflective medium based on the detected power level of the second portion of each of the channel signals.

BRIEF DESCRIPTION OF THE DRAWINGS

The present invention becomes better understood upon reading of the following description and claims with reference to the following drawings, in which:

DETAILED DESCRIPTION OF THE INVENTION

Figure 1:
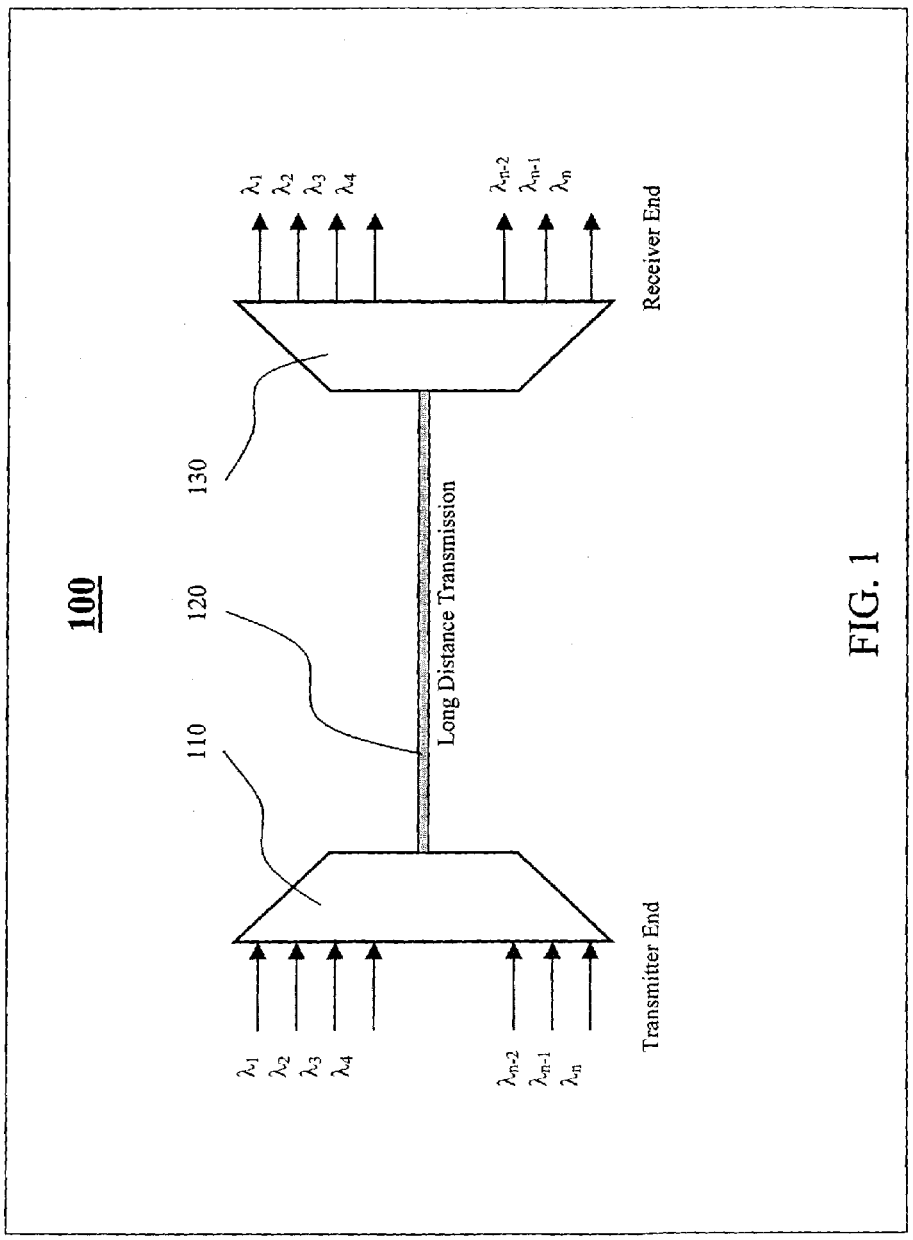
FIG. 1 is a schematic showing a point-to-point link of a DWDM network.

FIG. 1 schematically shows a point-to-point link of a dense wavelength-division multiplexing (DWDM) network 100 in which the system and method of the present invention can be used. As shown in FIG. 1, at the transmitter end, a group of n individual signals whose center wavelengths are at $\lambda_1, \lambda_2, \lambda_3, \ldots \lambda_{n-1}, \lambda_n$, are assembled by a wavelength-division multiplexer 110. The assembled composite signal which contains a plurality of wavelengths is then transmitted over a single optical fiber 120. After the transmission over a long distance, the signal is delivered to the receiver end, where a wavelength-division demultiplexer 130 is used to decompose the composite signal into their respective components, $\lambda_1, \lambda_2, \lambda_3, \ldots \lambda_{n-1}, \lambda_n$.

During transmission, individual wavelength channels will experience power dissipation, signal-to-noise ratio degradation, dispersion, etc. Conventionally, one or more optical amplifiers in a cascade are used to boost optical signals so that these channel signals are recognizable when they arrive at the receiver end. The typical optical amplifiers commonly used in the C-band are erbium-doped fiber amplifiers (EDFAs). Other types of optical amplifiers are also commercially available, such as Raman optical amplifiers (ROA) and semiconductor optical amplifiers (SOA). The effective and economic use of any optical amplifiers for multi-channel networks requires the knowledge of channel power distribution.

Figure 2:
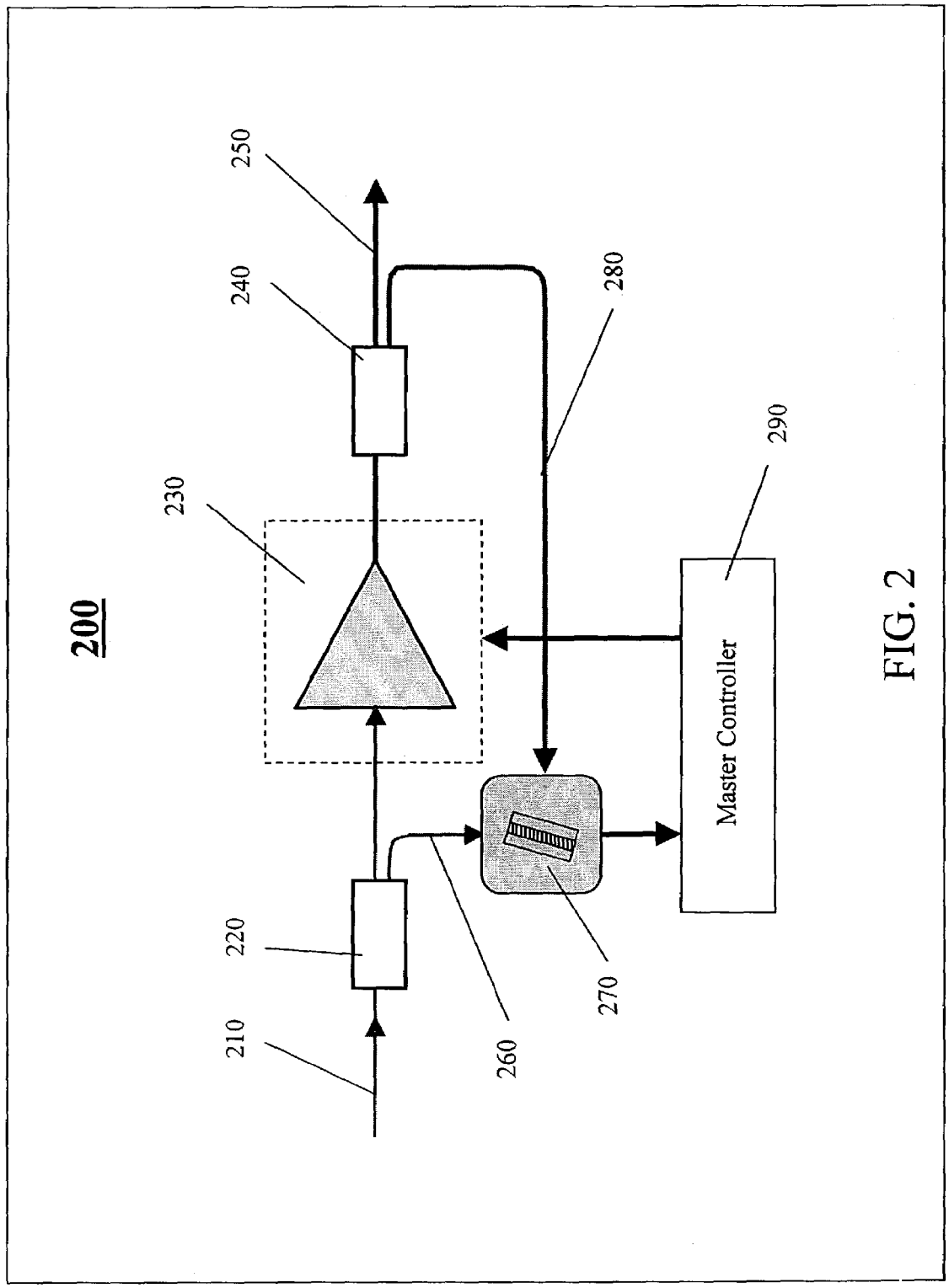
FIG. 2 is a schematic showing an optical amplifier in conjunction with a spectral monitoring unit used in a communications network.

FIG. 2 schematically shows a device for communications network 200 comprising an optical amplifier 230 in conjunction with a spectral monitoring unit 270. As shown in FIG. 2, the input 210 and output 250 signals are spectrally monitored by the spectral monitoring unit 270, from which channel powers and their distributions are dynamically measured and subsequently converted into electronic signals. These electronic signals are utilized to control the optical amplifier 230 through a master controller 290. Two tap couplers 220, 240 are used to take a small fraction of energy to be measured from the signals 210 and 250. The tapped input 260 and output 280 signals are directed to the spectral monitoring unit 270. A compact optical performance monitor and a low cost compact optical amplifiers with spectral gain monitoring capabilities are described in U.S. patent application Ser. No. 09/715,765, filed November 2000 and U.S. Patent Application No. 60/328,342, filed October 2001, the disclosures of which are incorporated herein by reference in their entirety.

Figure 3:
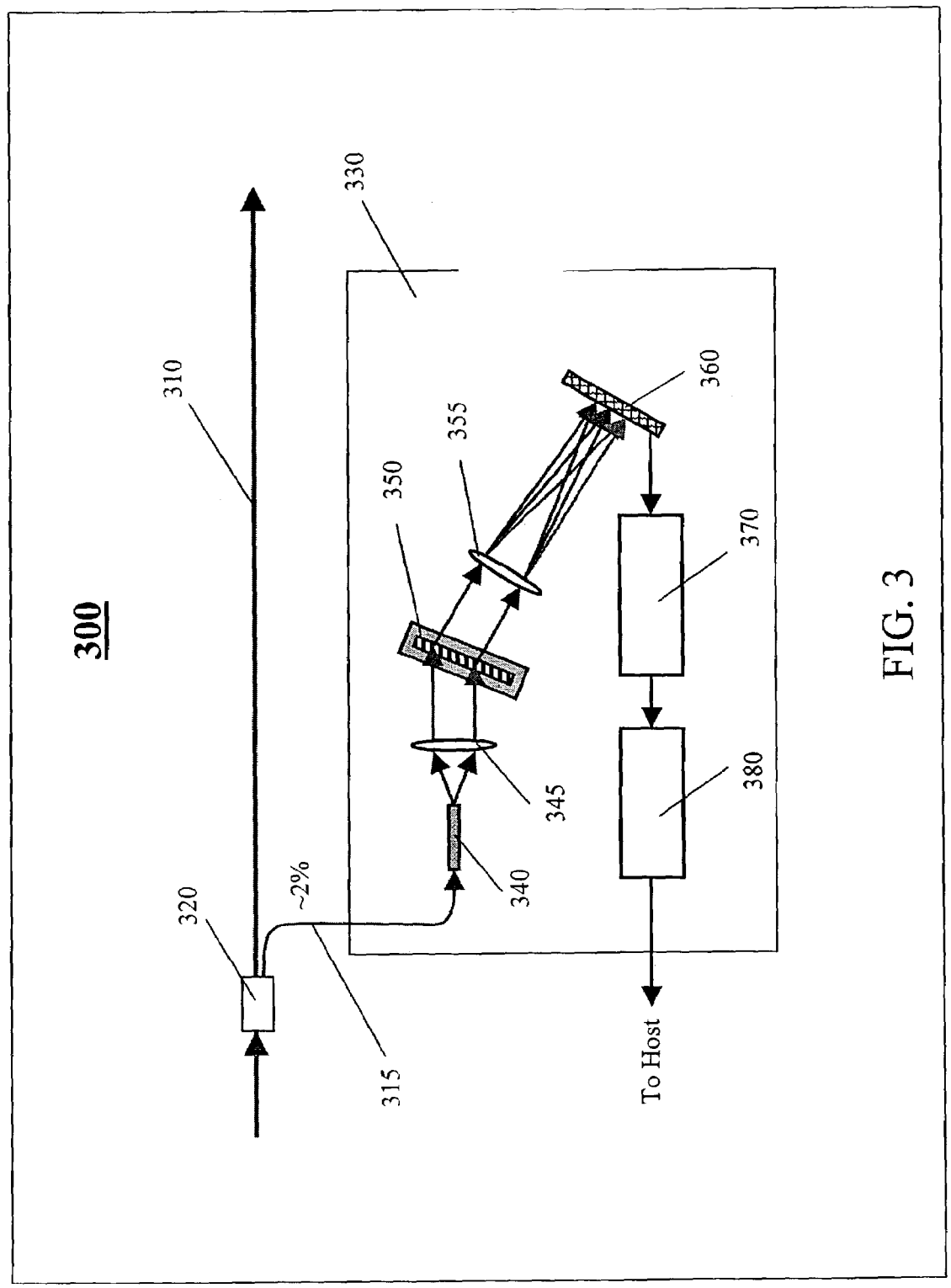
FIG. 3 is a schematic showing a spectral monitoring unit comprising a spectral dispersion element, a micro-detector array, and associated signal processing electronics.

FIG. 3 schematically shows a spectral monitoring unit 330 used in a communications link 300. A fractional portion (e.g., 2%) of energy 315 is tapped by a coupler 320 from the mainstream optical signal 310 for monitoring purpose while keeping the properties of the main traffic 310 unchanged. Since the tapped signal will not be added back to the mainstream signal 310, the properties of the transmitted data are not affected and the spectral monitoring unit 330 provides a non-invasive measurement. The weak signal 315 tapped from the networks is then directed to the spectral element 350 through input fiber 340 and collimating optics 345, from which the channelized wavelength components are separated in space. These spatially dispersed signals are directed to a series of detectors 360 through a focusing lens 355, and from this, the light signals are converted into electric signals. The electric outputs are transmitted to the electronic circuitry 370 for processing and outputting, or stored in memory 380, from which the power, wavelength, and optical signal-to-noise ratio (OSNR) are obtained.

The output power from optical amplifiers, or after optical add/drop multiplexers, is usually required to be equalized in the DWDM networks, that is, all existing channels have substantially equal powers. The equalization of power can be implemented by means of a dynamical gain equalizer (DGE) responsible for optical amplifiers, and optical channel equalizer (OCE) associated with more general channel equalization applications. As far as their operation principle is concerned, a DGE can be the same device as an OCE. For example, a DGE can be, but not limited to, a variable optical attenuator (VOA) array, in which each attenuator element is corresponding to one specific wavelength channel. These VOA elements are electrically controlled by a master controller according to the spectral information obtained by the spectral monitoring unit 330.

Figure 4:
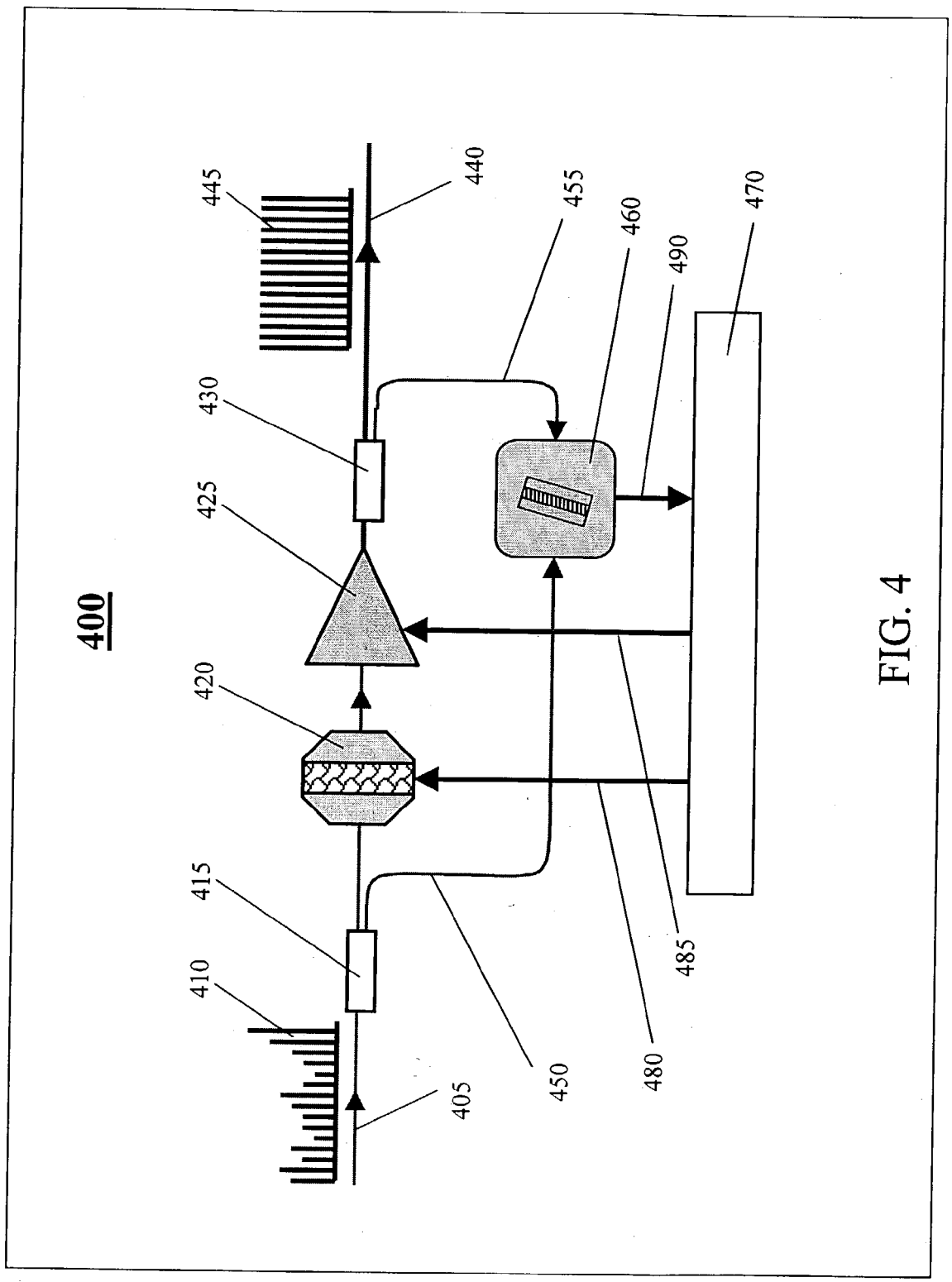
FIG. 4 is a schematic illustrating a gain-equalized optical amplifier module comprising a dynamical gain equalizer, an optical amplifier and a spectral monitoring unit.

FIG. 4 shows a gain-equalized optical amplifier module 400 that integrates a dynamical gain equalizer 420, an optical amplifier 425 and a spectral monitoring unit 460. The input weak signal 405 with its channel power distribution 410 is inputted to the gain-equalized optical amplifier module 400. The input spectrum 410 is uneven, which may be caused by adding and dropping channels, or multiplexing channels. A small fraction 450 of the input signal 410 is taken with the use of a tap coupler 415 and is sent to the spectral monitoring unit 460. The main signal after the tap coupler 415 is processed by the dynamical gain equalizer 420 and subsequently amplified by the optical amplifier 425. The amplified output signal 440 is also spectrally monitored by the spectral monitoring unit 460 with the help of a tap coupler 430 that takes a small fraction 455 of the main signal. The spectral monitoring unit 460 measures the input and output power profiles 405 and 445, based on which the dynamic gain equalizer 420 can adjust its loss spectrum profile to the optical amplifier 425 so that the output spectrum 445 from the amplifier 425 is substantially flattened. The spectral information obtained by the spectral monitoring unit 460 is transferred to an electronic circuitry 470, which controls the dynamical gain equalizer 420 in adjusting the spectral profile and manipulates the optical amplifier 425 through controlling its gain and pump current etc. Lines 480, 485, and 490 are electrical links. Optical amplifiers can be, but not limited to erbium-doped fiber amplifiers, semiconductor optical amplifiers, or Raman amplifiers.

In the embodiment shown in FIG. 4, the dynamic gain equalizer 420 is positioned before the optical amplifier 425. The dynamical gain equalizer 420 can also be positioned after the optical amplifier 425. Multiple amplifiers can be used. For example, two optical amplifiers can be used to effectively boost the signal and one dynamical gain equalizer is preferably placed between the two amplifiers.

Figure 5:
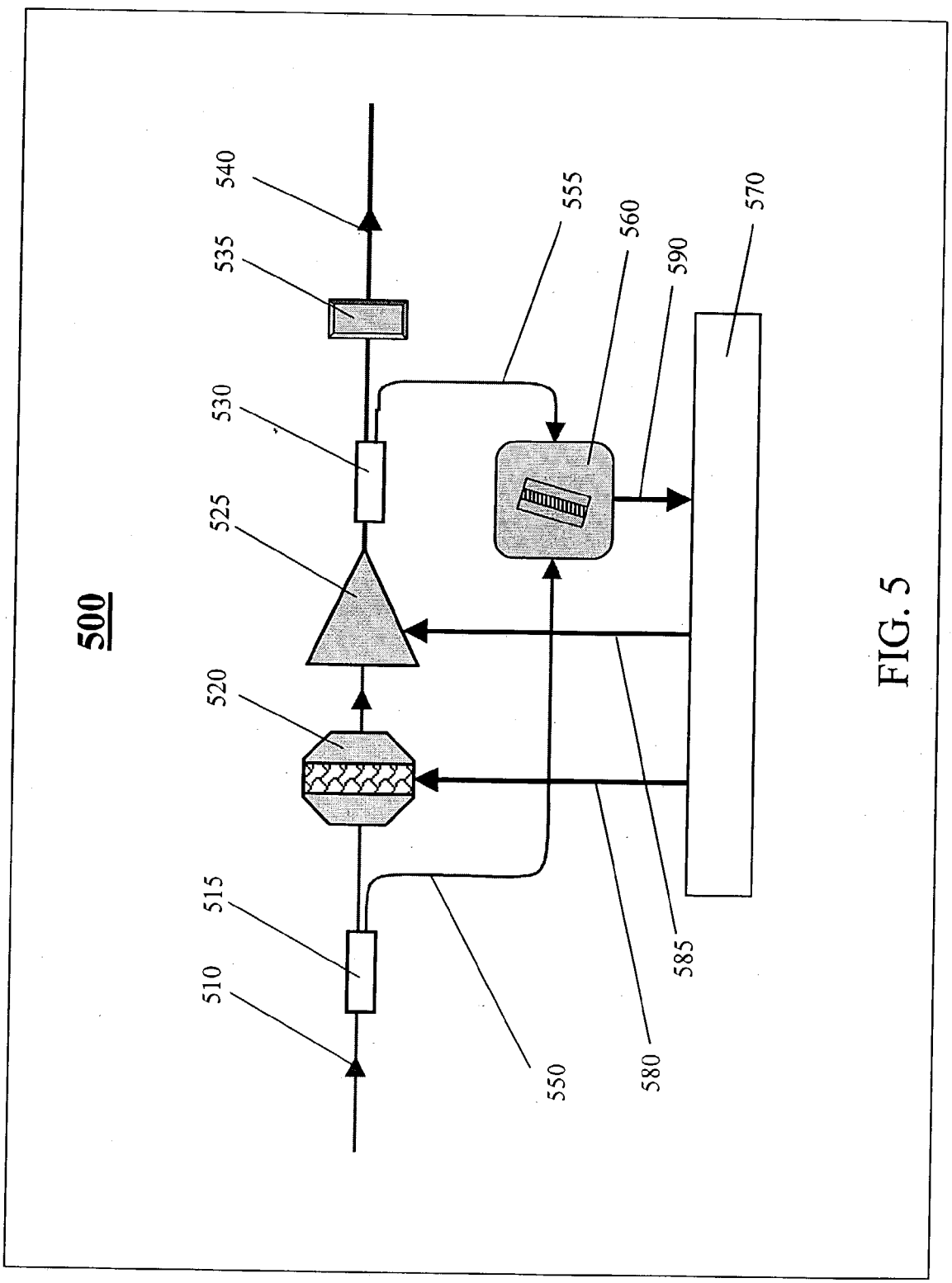
FIG. 5 is a schematic illustrating a gain-equalized optical amplifier module of FIG. 4 further comprising a dispersion compensation unit.

FIG. 5 shows a more complicated module in which a dispersion compensator is integrated into the dynamical gain-equalized optical amplifier module shown in FIG. 4 to form a multi-functional signal conditioner 500. As in FIG. 4, the conditioner 500 includes tap couplers 515 and 530, a spectral monitoring unit 560, and electronic control circuitry 570. The tap coupler 515 sends a small fraction 550 of an input signal 510 to the spectral monitoring unit 560, and the tap coupler 530 sends a small fraction 555 of a main signal 550 to the spectral monitoring unit 560. The electronic control circuitry 570 receives spectral information from the spectral monitoring unit 560 and controls an optical amplifier 525 and a dynamical gain equalizer 520 over lines 590, 580, and 585, respectively, also as in FIG. 4. In the embodiment shown in FIG. 5, the signal conditioning includes not only signal amplification and channel power equalization, but also dispersion management. The dispersion compensator 535 can be placed at any location along the main line from 510 to 540, i.e., before dynamical gain equalizer 520, or between the dynamical gain equalizer 520 and optical amplifier 525. The dispersion compensator 535 can be any dispersion management units such as chromatic dispersion compensator, polarization mode dispersion (PMD), and intermodal dispersion for multi-mode fiber link.

Figure 6:
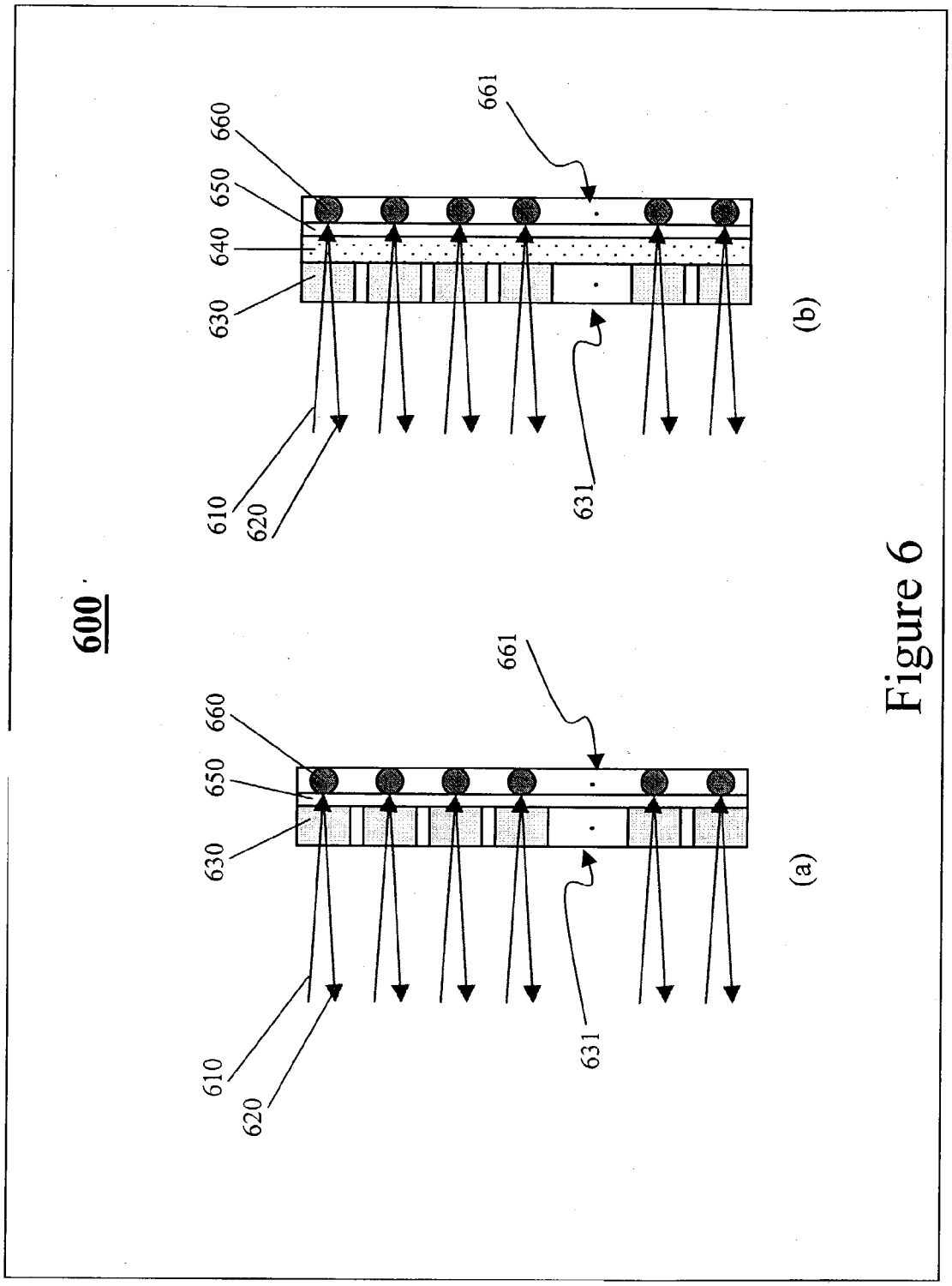
FIGS. 6A and 6B are schematics showing signal conditioners in accordance with one embodiment of the present invention.

FIG. 6 shows a device for conditioning a multi-channel optical signal in accordance with one embodiment of the invention. In general, the device 600 comprises an optical attenuator 631 for adjusting the power level associated with each of the multiple channels, a reflective medium 650, an optical detector 661 for detecting the power level, and a controller (not shown in FIG. 6) electrically connected to the optical attenuator 631 and detector 661 for controlling the optical attenuator 631 according to the detected signals from the optical detector 661.

As shown in FIGS. 6A and 6B, the optical attenuator 631 comprises multiple attenuating elements 630, each corresponding to one of the multiple-channel input 610 and output 620 signals. The attenuating elements 630 adjust or attenuate the power levels of the corresponding channel signals transmitted through the attenuating elements 630. In one embodiment, the attenuating elements 630 are preferably variable optical attenuators (VOAs).

The reflective medium 650 is made of a material of high reflectivity. Examples of such materials include multilayer coating film. For a given channel signal 610, the reflective medium 650 reflects a first large portion back to the corresponding attenuating elements 630, and transmits a second small portion which is then detected by the detector 661. The reflectivity of the reflective medium 650 should be high enough to reduce the insertion loss of the device, but not too high to prevent the detector 661 from detecting the signal. For example, the reflective medium 650 preferably reflects 98 to 99 percent of an incident signal back to the attenuating elements 630, and transmits one to two percent of the incident signal to the detecting elements 660.

The detector 661 can be made of a material of high sensitivity. For example, indium gallium arsenate (InGaAs), which is commercially available, can be used as detector material. The detector 661 comprises multiple detecting elements 660 which correspond to each of the attenuating elements 630. The detecting elements 660 detect the power level of the second portion of the signals transmitted through the reflective medium 650 and convert the optical signals into electrical data.

A controller (not shown in FIG. 6) is provided in electrical communication with the optical attenuator 631 and the optical detector 661. The controller receives and processes the electrical data from the detector and controls the attenuating elements 630 according to the electrical data in adjusting the power level of the reflected first portion of the signals to provide conditioned channel signals 620. Preferably the controller is a microprocessor-based electronic unit. The microprocessor-based electronic unit is preferably programmable to control the attenuating elements 630 to provide a predetermined power level profile for the conditioned channel signals 620. A predetermined power level distribution of the output signals can therefore be achieved by the variable optical attenuators which are dynamically controlled by the microprocessor-based electronic unit. The predetermined power distribution can be in any arbitrary form. In one embodiment, the output power distribution can be substantially even or in declined straight line. In another embodiment, the output power distribution is in sinusoidal waveform.

FIG. 6B shows another embodiment of the signal conditioner of the invention. By comparison with FIG. 6A, a polarization regulator 640 is disposed between the attenuator 630 and the reflective medium layer 650. The polarization regulator 640 can eliminate or reduce the polarization mode dispersion. For example, the polarization regulator 640 can be a polarization dependent loss (PDL) compensator.

The optical conditioner as shown in FIGS. 6A and 6B can be integrated into a compact module.

Figure 7:
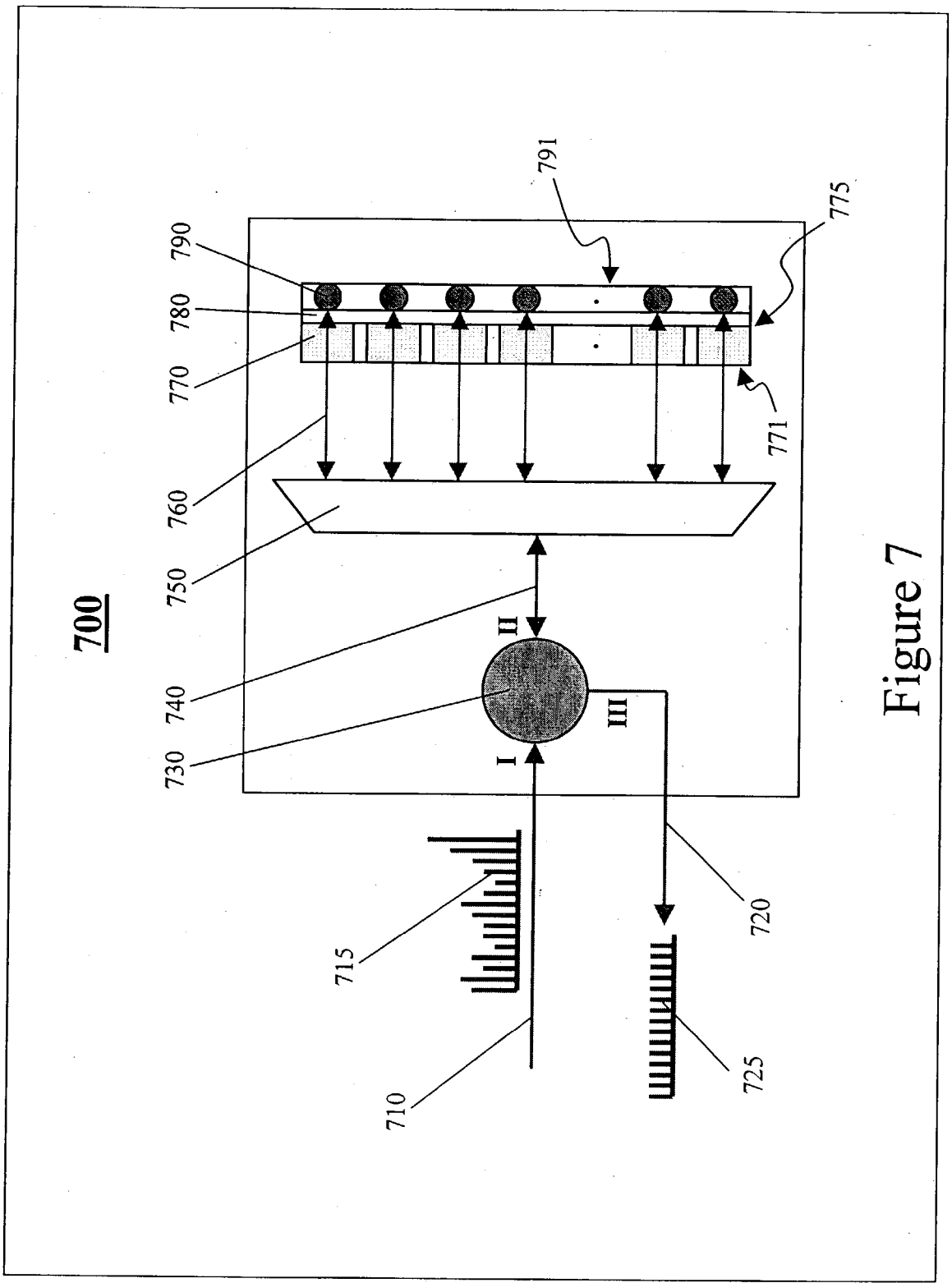
FIG. 7 is a schematic showing a system for conditioning a multiplexed multi-channel signal comprising the signal conditioner as shown in FIG. 6 in accordance with one embodiment of the present invention.

FIG. 7 shows a system for conditioning a dense wavelength multiplexed (DWDM) optical signal in accordance with one embodiment of the invention. In general, the system comprises a demultiplexer 750 configured to separate the multiple channels of the multiplexed optical signal, a signal processor 775 configured to condition the power level associated with each of the multiple channels, and a multiplexer 750 configured to assemble the conditioned multiple channel signals.

The multiplexer can be simultaneously utilized as a demultiplexer in this configuration. The multiplexer/demultiplexer 750 may be a volume phase grating-based device as described in U.S. Pat. No. 6,108,471 and U.S. Pat. No. 6,275,630, the disclosures of which are incorporated herein by reference in their entirety.

The signal processor 775 can be the type as shown in FIGS. 6A and 6B. In particular, the signal processor 775 comprises an optical attenuator 771 for adjusting the power level associated with each of the multiple channels, a reflective medium 780, an optical detector 791 for detecting the power level, and a controller (not shown in FIG. 7) electrically connected to the optical attenuator 771 and the optical detector 791 for controlling the optical attenuator 771 according to detected signals from the optical detector 791. The optical attenuator 771 comprises multiple attenuating elements 770 each corresponding to one of the multiple channel signals. The attenuating elements 770 adjust or attenuate the power levels of the corresponding channel signals transmitted through the attenuating elements 770. In one embodiment, the attenuating elements 770 are preferably variable optical attenuators (VOAs). The high reflective medium 780 is made of a material having a reflectivity high enough to reduce the insertion loss of the signal processor 775, but not too high to prevent the optical detector 791 from detecting the signal. The optical detector 791 can be made of a material of high sensitivity such as indium gallium arsenide (InGaAs). The optical detector 791 comprises multiple detecting elements 790 which correspond to each of the attenuating elements 770. The detecting elements 790 detect the power level of the signals transmitted through the reflective medium 780 and convert the optical signals into electrical data. A controller (not shown in FIG. 7) is included in the signal processor and in electrical communication with the optical attenuator 771 and the optical detector 791. The controller receives electrical data from the optical detector 791 and controls the attenuating elements 770 according to the electrical data in adjusting the power level of the reflected signals to provide conditioned channel signals 760. Preferably the controller is a microprocessor-based electronic unit that is programmable to control the attenuating elements 770 to provide a predetermined power level profile for the conditioned channel signals 760.

The system may further comprise a circulator 730 in optical communication with the multiplexing/demultiplexing unit 750. The circulator 730 comprises a first port I for inputting an unconditioned multiplexed signal to the circulator 730, a second port II for providing the unconditioned signal to and receiving a conditioned signal from the integrated multiplexing/demultiplexing unit 750, and a third port III for outputting a conditioned multiplexed signal from the circulator 730.

As shown in FIG. 7, a composite signal 710 containing a plurality of wavelengths is incident upon the input first port I of the circulator 730. The input power distribution 715 across all wavelength channels is uneven. This signal is inputted to the first port I and passes through the optical circulator 730, emerges as a forward-traveling beam 740, and then is directed to the demultiplexer/multiplexer 750. The demultiplexer/multiplexer 750 separates the composite signal in space and directs respective channels 760 to corresponding variable optical attenuator elements 770. The incoming signal is incident upon one attenuating element 770 and transmitted through the attenuating element 770. The reflective medium 780 reflects a major portion of the transmitted signal back to the attenuating element 770. The signal passes through the same variable optical attenuator element 770 twice and its channel power is adjusted accordingly to provide the backward output beam 760. When the transmitted signal strikes the reflective medium 780, a small fraction of energy is transmitted through the reflective medium 780 and detected by the detecting element 790. The microprocessor-based controller receives and processes the electrical data from the detector 791 and controls the attenuating elements 770 according to the electrical data in adjusting the power level of the reflected signals to provide conditioned channel signals. The output beam 760 backwardly propagates towards the demultiplexer/multiplexer 750 which assembles the individual signals and forms a new composite signal 740. The composite signal 740 is inputted to the second port II of the circulator 730 and outputted from the third port III of the circulator 730. Thus, the uneven optical signal 710 has been conditioned and a channel power-equalized signal 720 is obtained with its spectrum 725.

Figure 8:
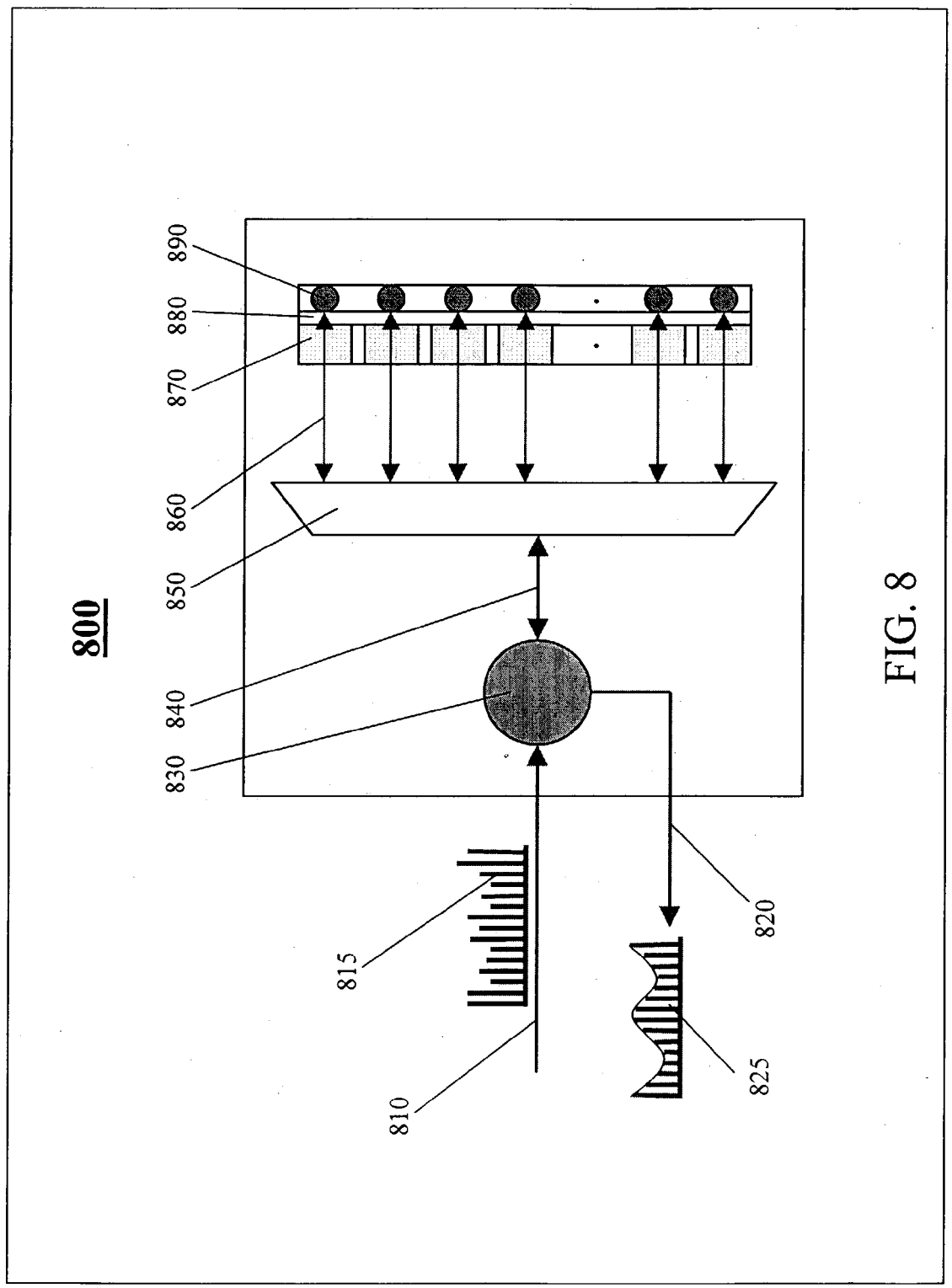
FIG. 8 is a schematic showing a system for conditioning a multiplexed multi-channel signal comprising the signal conditioner as shown in FIG. 6 in accordance with another embodiment of the present invention.

The system 700 shown in FIG. 7 can be used as a channel power equalizer. However, the system module can also be used for more general purposes. The output power distribution can be arbitrary, such as in declined straight line encountered in gain tilt, sinusoidal waveform, or any other profiles. The target power distribution is achieved with the variable optical attenuators which are dynamically controlled by the microprocessor-based master circuitry. FIG. 8 shows the same configuration as in FIG. 7 but configured to produce a non-level output power distribution. In FIG. 8, as in FIG. 7, there is a composite signal 810, having an input power distribution 815, incident upon an input first port of a circulator 830. A forward-traveling beam 840 emerges from the circulator 830 and is directed to a demultiplexer/multiplexer 850 which separates the composite signal 810 and directs respective channels to corresponding variable optical attenuator elements 870. The incoming signal passes through the attenuating element 870 and interacts with a reflective medium 880 that reflects a major portion of the signal back to the attenuating element 870 and transmits a small fraction of energy to a detecting element 790. Output beams 860 backwardly propagate towards the demultiplexer/multiplexer 850 which assembles the individual signals and directs the assembled signals to a second port of the circulator 830 which outputs a channel power-equalized signal 820 with a spectrum 825 from a third port of the circulator 830. In this example, the signal has been equalized to create the spectrum 825 sinusoidal waveform.

Figure 9:
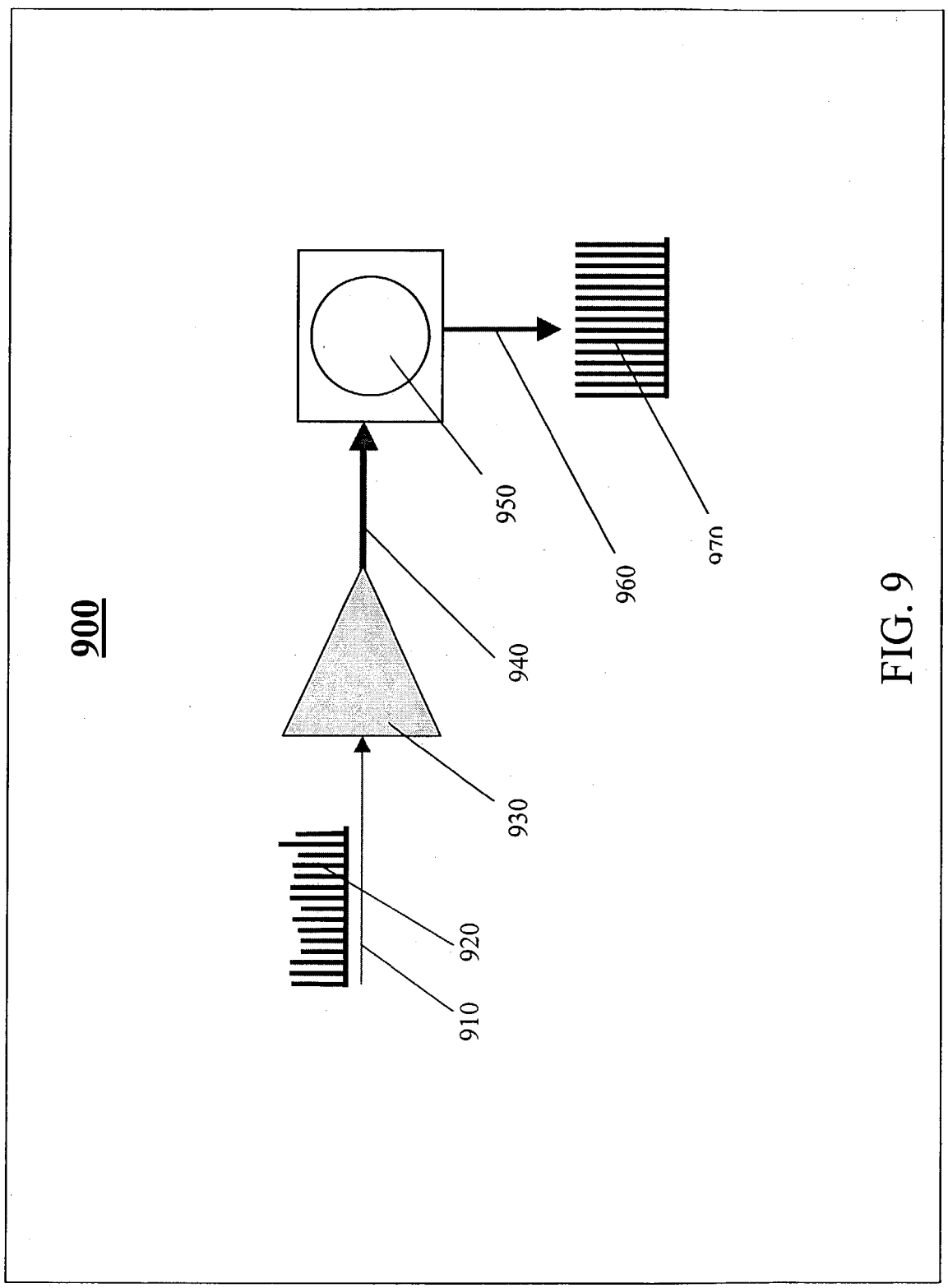
FIG. 9 is a schematic showing a system for conditioning a multiplexed multi-channel signal comprising the optical signal conditioning system as shown in FIG. 7 in accordance with one embodiment of the present invention.

FIG. 9 shows a conditioner system for conditioning a dense wavelength division multiplexed (DWDM) optical signal in accordance with another embodiment of the invention. In general, the system 900 comprises an optical amplifier 930 configured to amplify the power level of an input multiplexed signal 910 and an optical signal processor 950 in optical communication with the optical amplifier 930 configured to condition the power level of the amplified signal 940. In this configuration, the input signal is amplified first and then conditioned. Alternatively, the optical amplifier 930 and optical signal processor 950 are arranged such that the input multiplexed signal is conditioned first by the optical signal processor 950 and then amplified by the optical amplifier 930.

The optical signal processor 950 can be the system module as shown in FIG. 7. In particular, the optical signal processor may comprise a demultiplexing/multiplexing unit configured to separate the input multiplexed optical signal and assemble the conditioned multiple channel signals, an optical attenuator, an optical detector, a reflective medium disposed between the optical attenuator and optical detector, and a microprocessor-based controller configured to condition the power level associated with each of the multiple channels.

Preferably the optical amplifiers are small-size erbium-doped fiber amplifiers (EDFAs) for strengthening signals over C-band or L-band. Channels with weaker power are directed to EDFAs for power amplification while the remaining channels having higher power are treated as express channels that do not pass through the optical amplifiers. The advantage of this amplifier is that weak signals can be effectively amplified while keeping low power consumption.

As shown in FIG. 9, a weak input signal 910 with an uneven spectrum 920 is amplified by the optical amplifier 930. The outputted power profile from the amplifier 930 is highly non-uniform due to the uneven input and non-uniform optical amplification across wavelengths. Such a signal 940 is processed by the optical signal processor 950. A power-equalized signal 960 with its spectrum 970 is then achieved. In this example, the processor 950 equalizes the input uneven signal 940 and provides the flat signal 960.

Figure 10:
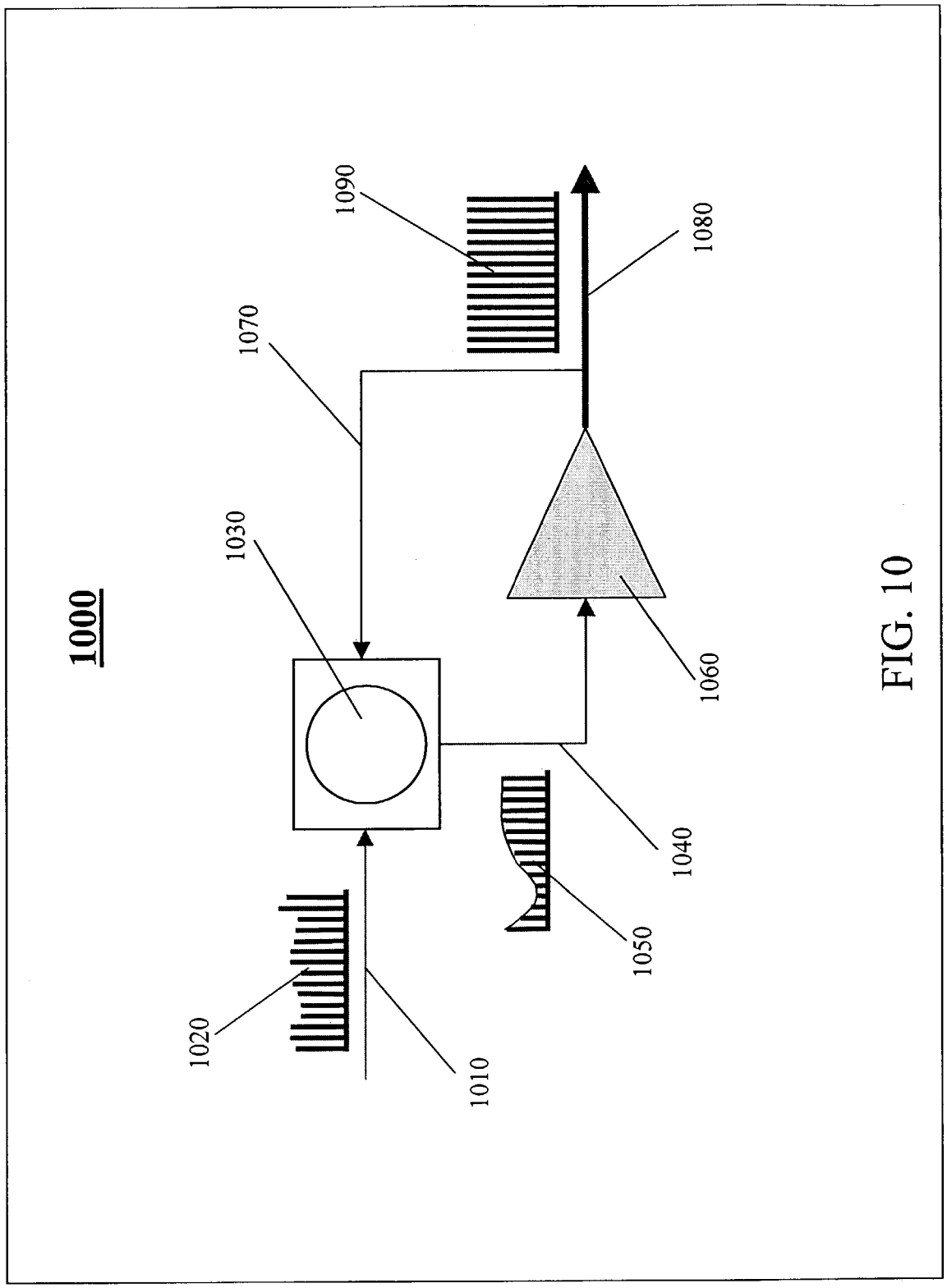
FIG. 10 is a schematic showing a system for conditioning a multiplexed multi-channel signal comprising the optical signal conditioning system as shown in FIG. 7 in accordance with another embodiment of the present invention.

FIG. 10 shows a conditioner system 1000 comprising an optical signal processor 1030 positioned before an optical amplifier 1060. As shown in FIG. 10, the weak input signal 1010 with its uneven spectrum 1020 is first processed by the optical signal processor 1030, from which a special power spectrum 1050 of the signal 1040 is provided. The spectrum 1050 has such a shape that it can counteract the gain profile of the following optical amplifier 1060, resulting in an output signal 1080 having an equalized power distribution 1090. For a complete control, the output signal 1080 is also spectrally monitored via line 1070.

The present invention provides a method of conditioning a DWDM signal. The method comprises the following steps:

separating the multiplexed signal into multiple channels having a power level associated with each of the channels;

passing each of the separated channel signals through an optical attenuator. The optical attenuator having multiple attenuating elements for adjusting power levels of the channel signals passed though the optical attenuator;

passing each of the attenuated channel signals through a reflective medium. The reflective medium reflects a first portion of each of the attenuated multiple channel signals to the attenuating elements and transmits a second portion of each of the attenuated multiple channel signals to an optical detector. The optical detector has multiple detecting elements corresponding to each of the multiple attenuating elements.

detecting the power level of the second portion of each of the multiple channel signals passed through the reflective medium; and controlling the attenuating elements in adjusting the power level of the first portion of the signal of each of the multiple channels reflected by the reflective medium based on the detected power level of the second portion of each of the channel signals.

As described above, a system and method that effectively condition optical performance of signals in all-optical fiber-optic communications networks have been described. The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

We claim:

1. A device for conditioning a multi-channel optical signal having
a power level associated with each of the channels, comprising:
an optical attenuator having multiple attenuating elements each corresponding to one of the multiple channels, said attenuating elements adjusting the power levels of the corresponding channel signals transmitted therethrough;
an optical detector having multiple detecting elements each corresponding to one of the multiple attenuating elements;
a reflective medium disposed between the optical attenuator and the optical detector, said reflective medium reflecting a first portion of each of the multiple channel signals transmitted through the attenuating elements and transmitting a second portion of each of the multiple channel signals transmitted through the attenuating elements to the corresponding one of the multiple detecting elements; and
a controller in electrical communication with the optical attenuator and the optical detector; wherein: the detecting elements detect the power level of the second portion of each of the multiple channel signals transmitted through the reflective medium and converts optical signals to electrical data; and the controller receives and processes the electrical data and controls the multiple attenuating elements according to the electrical data in order to adjust the power level of the reflected first portion of each of the multiple channel signals to provide conditioned channel signals.

2. The device of claim 1 further comprising a polarization regulator disposed between the attenuator and the reflective medium.

3. The device of claim 2 wherein the polarization regulator comprises a polarization dependent loss (PDL) compensator.

4. The device of claim 1 wherein the optical attenuator, the optical detector, the reflective medium, and the controller are integrated into a compact module.

5. The device of claim 1 wherein the attenuating elements comprise variable optical attenuators (VOAs).

6. The device of claim 1 wherein the reflective medium is made of a material that reflects a first portion of 98 to 99 percent of each of the multiple channel signals transmitted through the attenuating elements and transmits a second portion of one to two percent of each of the multiple channel signals.

7. The device of claim 6 wherein the reflective medium comprises a multilayer coating film.

8. The device of claim 1 wherein the detecting elements comprise indium gallium arsenide (InGaAs).

9. The device of claim 1 wherein the controller comprises a micro-processor-based electronic unit.

10. The device of claim 9 wherein the microprocessor-based controller is programmable in controlling the attenuating elements to provide a predetermined non-level output power distribution for the conditioned channel signals.

11. The device of claim 10 wherein the predetermined power distribution is sinusoidal.

12. A system for conditioning a dense wavelength division multiplexed (DWDM) optical signal having multiple channels each having a power level associated therewith, comprising:
a demultiplexer configured to separate the multiple channels of the multiplexed optical signal;
a signal processor configured to condition the power level associated with each of the multiple channels; and
a multiplexer configured to assemble the conditioned multiple channel signals;
wherein the signal processor comprises:
an optical attenuator having multiple attenuating elements each corresponding to one of the separated channel signals, the attenuating elements adjusting the power levels of the corresponding channel signals transmitted therethrough;
an optical detector having multiple detecting elements each corresponding to one of the multiple attenuating elements;
a reflective medium disposed between the optical attenuator and the optical detector, said reflective medium reflecting a first portion of each of the multiple channel signals transmitted through the attenuating elements and transmitting a second portion of each of the multiple channel signals to the corresponding one of the multiple detecting elements; and
a controller in electrical communication with the optical attenuator and the optical detector; wherein:
the detecting elements detects the power level of the second portion of each of the multiple channel signals and converts optical signals to electrical data; and
the controller receives and processes the electrical data and controls the multiple attenuating elements according to the electrical data in order to adjust the power level of the first portion of each of the multiple channel signals to provide conditioned multiple channel signals.

13. The system of claim 12 wherein the multiplexer and demultiplexer are an integrated unit performing both multiplexing and demultiplexing.

14. The system of claim 13 wherein the integrated multiplexer and demultiplexer unit comprises a volume phase grating.

15. The system of claim 13 further comprising a circulator in optical communication with the integrated multiplexer and demultiplexer unit, the circulator having a first port for inputting an unconditioned multiplexed signal to the circulator, a second port for providing the unconditioned signal to and receiving a conditioned signal from the integrated multiplexer and demultiplexer unit and a third port for outputting the conditioned multiplexed signal from the circulator.

16. The system of claim 12 wherein the signal processor is an integrated compact module.

17. The system of claim 12 wherein the signal processor further comprises a polarization dependent loss (PDL) compensator disposed between the optical attenuator and the optical detector.

18. The system of claim 12 wherein the attenuating elements comprise variable optical attenuators (VOAs).

19. The system of claim 11 wherein the detecting elements comprise indium gallium arsenide (InGaAs).

20. The system of claim 12 wherein the controller comprises a micro-processor-based electronic unit.

21. A system for conditioning a dense wavelength division multiplexed (DWDM) optical signal having multiple channels each having a power level associated therewith, comprising:
an optical amplifier configured to amplify the power levels of the multiple channel signals;
a demultiplexing/multiplexing device configured to separate and assemble the multiple channels of the optical signal; and
an optical signal processor in optical communication with the optical amplifier and the demultiplexing/multiplexing device configured to condition the power levels of the multiple channel signals, the optical signal processor comprises:
an optical attenuator having multiple attenuating elements each corresponding to one of multiple channel signals, said attenuating elements adjusting the power levels of the corresponding channel signals transmitted therethrough;
an optical detector having multiple detecting elements each corresponding to one of the multiple attenuating elements;
a reflective medium disposed between the optical attenuator and the optical detector, said reflective medium reflecting a first portion of each of the multiple channel signals transmitted through the attenuating elements and transmitting a second portion of each of the multiple channel signals to the corresponding one of the multiple detecting elements; and
a microprocessor-based controller in electrical communication with the optical attenuator and the optical detector; wherein:
the detecting elements detects the power level of the second portion of each of the multiple channel signals transmitted though the reflective medium and converts optical signals to electrical data; and
the microprocessor-based controller receives and processes the electrical data and controls the multiple attenuating elements based on the electrical data in adjusting the power level of the reflected first portion of each of the multiple channel signals to provide conditioned multiple channel signals.

22. The system of claim 21 wherein the microprocessor-based controller is further electrically connected to the optical amplifier and controls the optical amplifier in amplifying the power levels of the multiple channel signals.

23. The system of claim 21 wherein the optical signal processor, the optical amplifier and the demultiplexing/multiplexing device are an integrated module.

24. The system of claim 21 wherein the optical amplifier and the optical signal processor are disposed such that the power level of an input signal is first amplified and then conditioned to provide an output signal having a predetermined power level profile.

25. The system of claim 21 wherein the optical amplifier and the optical signal processor are disposed such that an input signal is first conditioned to provided a predetermined power level profile and then amplified.

26. A method of conditioning a multiplexed multi-channel optical signal having a power level associated with each of the multiple channels, comprising:

separating the multiplexed signal into multiple channels having a power level associated with each of the channels;

passing each of the separated channel signals through an optical attenuator, said optical attenuator having multiple attenuating elements for adjusting the power levels of multiple channel signals;

passing each of the attenuated channel signals through a reflective medium, said reflective medium reflecting a first portion of each of the attenuated multiple channel signals to the attenuating elements and transmitting a second portion of each of the attenuated multiple channel signals to an optical detector, said optical detector having multiple detecting elements corresponding to each of the multiple attenuating elements;

detecting the power level of the second portion of each of the multiple channel signals passed through the reflective medium; and controlling the attenuating elements in order to adjust the power level of the first portion of signal of each of the multiple channels reflected by the reflective medium according to the detected power level of the second portion of each of the channel signals.

27. The method of claim 26 wherein the reflective medium reflects a first portion of about 98 to 99 percent of each of the attenuated multiple channel signals to the attenuating elements and transmitting a second portion of about one to two percent of each of the attenuated multiple channel signals.

28. The method of claim 26 wherein the attenuating elements are controlled to provide a predetermined power level profile for the conditioned multiple channel signals.

29. The method of claim 28 wherein the predetermined power level profile is in any regular waveform.

30. The method of claim 28 wherein the predetermined power level profile is substantially even.

31. The method of claim 26 further comprises a step of amplifying the power level of the multiple channel signals.

32. The method of claim 31 wherein the power level profile of the conditioned multiple channel signals is predetermined to be substantially uniform across the amplified multiple channel signals.

33. A device for conditioning a multi-channel optical signal comprising:

an optical attenuator layer including multiple attenuating elements, each attenuating element configured to transmit therethrough a signal of a channel of the multi-channel optical signal, and each attenuating element being adjustable to vary a power level of the signal;

an optical detector layer including multiple detecting elements each corresponding to one of the multiple attenuating elements and each configured to convert optical signals to electrical data; and a reflective medium layer disposed between the optical attenuator and optical detector layers and configured to, for each channel, reflect a first portion of each signal back through the attenuating element and transmit a second portion of each signal to the corresponding detecting element;

whereby, for each channel, electrical data from the detecting element corresponding to the second portion of the signal can be used to adjust the attenuating element, thereby conditioning the multi-channel optical signal.

* * * * *